United States Patent [19]

Gamble et al.

[11] 4,038,491

[45] July 26, 1977

[54] FLUID CASTING COMPOSITION CONTAINING LOW EXPANSION GLASS FILLER

[75] Inventors: James R. Gamble, Unity Township, Westmoreland County; James W. Chapman, Penn Hills Township, Allegheny County, both of Pa.

[73] Assignee: Westinghouse Electric Corporation, Pittsburgh, Pa.

[21] Appl. No.: 671,853

[22] Filed: Mar. 30, 1976

[51] Int. Cl.[2] ........................ H01B 17/26; C08L 63/00

[52] U.S. Cl. .................................. 174/153 R; 106/54; 174/137 B; 252/63.5; 252/64; 260/37 EP; 260/37 SB; 260/38; 260/40 R

[58] Field of Search ....................... 260/37 EP, 40, 38; 252/63.5, 64; 106/54; 174/153, 137 B

[56] References Cited

U.S. PATENT DOCUMENTS

| | | | |
|---|---|---|---|
| 3,183,104 | 5/1965 | Thomas | 106/54 X |
| 3,433,893 | 3/1969 | Hofmann et al. | 174/153 R |
| 3,557,576 | 1/1971 | Baum | 252/63.5 X |

FOREIGN PATENT DOCUMENTS

| | | | |
|---|---|---|---|
| 673,596 | 6/1952 | United Kingdom | 174/137 B |

*Primary Examiner*—Lewis T. Jacobs
*Attorney, Agent, or Firm*—D. P. Cillo

[57] ABSTRACT

A fluid, filled, resinous casting composition, having a viscosity below about 20,000 cp. at 100° C, is made from liquid resin, resin curing agent, and as high as 85 weight percent of a glassy filler comprising about 50 to about 60 weight percent of $SiO_2$, about 12 to about 22 weight percent of $Al_2O_3$, about 5 to about 15 weight percent of $B_2O_3$, about 4 to about 14 weight percent of MgO and about 2.5 to about 12.5 weight percent of CaO.

10 Claims, 2 Drawing Figures

FLUID CASTING COMPOSITION CONTAINING LOW EXPANSION GLASS FILLER

BACKGROUND OF THE INVENTION

Cast epoxy resins are routinely used within the electrical industry as a replacement for metal and porcelain in such articles as transformer bushings. Epoxy resins are high in strength, low in shrinkage, and have excellent electrical properties. Their main disadvantage for replacement use in transformer bushings is their high thermal expansion.

Metals, such as aluminum, copper and stainless steel, commonly used in electrical apparatus, have coefficients of linear thermal expansion which are much lower than epoxy resins. During thermal cycling of an electrical assembly insulated with an epoxy resin, the stresses imposed can cause cracking of the insulation, as well as separation of the metal from the applied epoxy resin, with ultimate failure of the electrical assembly.

This problem was solved by Hofmann, in U.S. Pat. Nos. 3,434,087 and 3,547,871, and Tsukui, in U.S. Pat. No. 3,658,750. They incorporated low expansion filler materials, within critical particle size ranges, into the epoxy, to form a low expansion resin insulation system. The use of certain particle size distributions allowed high filler loading while maintaining good flow properties during casting, and the high filler loading allowed a close match of the applied resin system and the metal expansion characteristics.

The fillers used in the insulating resin systems included silicon dioxide as sand, fused silica or quartz; alumina; magnesia; zirconia; calcium oxide; zirconium silicate; calcium silicate; magnesium silicate; aluminum silicate; beryllium aluminum silicate; lithium aluminum silicate; barium sulfate; calcium sulfate; barium carbonate; calcium carbonate; cobalt sulfide; cadmium sulfide; cuprous sulfide; and cupric sulfide powder, alone or in combination.

The main all-purpose filler generally used is silicon dioxide, in the form of fused silica. Fused silica has a very low coefficient of linear thermal expansion (C.L.T.E.) of about $0.5 \times 10^{-6}$ in./in./° C, and a resin compatibility that allows high filler loading of the epoxy resin. The use of fused silica filler can lower the C.L.T.E. of the resin system to about $25 \times 10^{-6}$ in./in./° C, so that it can be bonded successfully to a majority of metals, for example copper, having a C.L.T.E. of about $17 \times 10^{-6}$ in./in./° C. The main disadvantages of fused silica are its relatively high cost, low thermal conductivity and limited supply.

It is desirable, therefore, that a new and improved filler be developed which can be easily produced, has a low cost, a high thermal conductivity, a low coefficient of thermal expansion, and a surface chemistry that will allow the filler to favorably react with and be wet by the epoxy resin. The filler must also allow excellent fluidity of the filled resinous composition at between 70 to 85 weight percent filler loading so that it is easily castable.

SUMMARY OF THE INVENTION

Briefly, the invention relates to an electrical assembly having a metallic element such as an electrically conducting stud, the assembly being subject to cyclical thermal expansion and contraction, and the metal element being in part encapsulated by a fully cured epoxy resin-filler system. The embedded element is formed by casting a highly fluid, filled resinous admixture about the element.

The filled resinous composition comprises an admixture of: (A) 100 parts by weight of a liquid resin; (B) about 250 to about 750 parts by weight of a powdered glassy filler comprising: about 50 to about 60 weight percent of $SiO_2$, about 12 to about 22 weight percent of $Al_2O_3$, about 5 to about 15 weight percent of $B_2O_3$, about 4 to about 14 weight percent of MgO, and about 2.5 to about 12.5 weight percent of CaO; and (C) about 20 to about 100 parts by weight of a suitable resin curing agent.

This provides an easily castable, filled resinous composition, having excellent fluidity at high filler loadings, i.e. a viscosity below about 20,000 cp. at 100° C. The cured, filled resinous composition has a low cost, high thermal conductivity, low coefficient of linear thermal expansion (C.L.T.E.), good flexural strength and excellent electrical characteristics. The filler by itself has a C.L.T.E. of about $4.8 \times 10^{-6}$ in./in./° C between 100° C to 400° C, a density of about 2.5 gm./cc., a pH of about 8.5 to about 9.5, and it interacts well with and is easily wet by the resin.

This filled casting composition is not only useful to encapsulate bushing studs, but may also be used, for example, to encapsulate coils of electrical transformers and turns of an electrical coil.

BRIEF DESCRIPTION OF THE DRAWINGS

For a better understanding of the invention, reference may be made to the preferred embodiment, shown in the accompanying drawings, in which.

DESCRIPTION OF THE PREFERRED EMBODIMENTS

Figure 1:
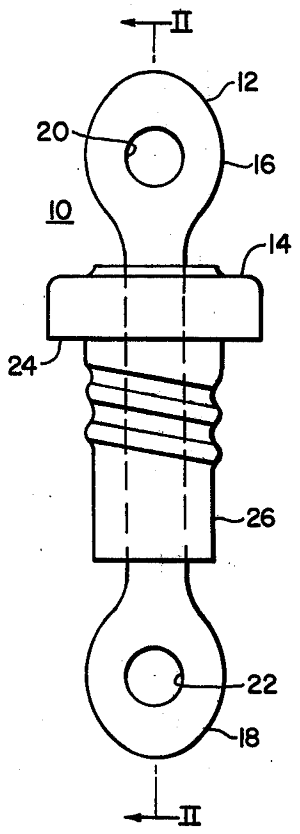
FIG. 1 is a front elevational view of one type of an electrical bushing assembly that can be constructed according to the teachings of the invention.

The present invention is not limited to the use of any particular kind of resin, since almost any liquid resinous composition would benefit from being filled with the particulate minerals of the invention. However, epoxy resins have exhibited the best resistance to thermal cycling. For this reason, the present description will emphasize the combination of the novel mineral filler system with these resins. It is to be understood that other well known resins such as polyesters, phenolics and silicones could be employed.

In practicing the present invention, the liquid epoxy (glycidyl polyether) resin may be an aromatic or a cycloaliphatic epoxy resin or an epoxy novolac resin, or mixtures thereof.

The resinous epoxy compositions which may be employed in the invention are relatively low viscosity liquids. They may be prepared by reacting predetermined amounts of at least one polyhydric phenol and at least one epihalohydrin in an alkaline medium.

Phenols which are suitable for use in preparing the resinous polymeric epoxides include those which contain at least two phenolic hydroxide groups per molecule. Polynuclear phenols which have been found to be particularly suitable include those wherein the phenol nuclei are joined by carbon bridges, such, for example, as 4,4'-dihydroxy-diphenyl-dimethyl-methane (referred to hereinafter as bis-phenol A), 4,4'-dihydroxy-diphenyl-methyl-methane and 4,4'-dihydroxy-diphenyl-methane.

While it is preferred to use epichlorohydrin as the epihalohydrin in the preparation of the resinous polymeric epoxides of the present invention, homologues thereof, for example, epibromohydrin and the like may also be used advantageously.

In the preparation of the resinous polymeric epoxides, aqueous alkali is employed to combine with the halogen of the epichlorohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide may be employed although it is preferred to use sodium hydroxide since it is relatively inexpensive.

The liquid epoxy resins suitable for use in accordance with the present invention may be defined in terms of their epoxy equivalent weight. This value is derived by dividing the molecular weight of the composition by the average number of 1,2-epoxide groups contained in the average molecule of the glycidyl ether. For the present invention epoxy resins having eposy equivalent weights within the range of about 125 to about 450 are employed. Within this range, the preferred equivalent weight is from about 125 to about 250. Values above about 450 result in relatively high viscosities. The preferred glycidyl polyether resin is a diglycidyl ether of bisphenol A.

The glycidyl polyethers of this invention may be cured by reaction with a resin curing agent, such as, for example, organic acid anhydrides. Examples of anhydrides which may be employed are hexahydrophthalic anhydride, tetrahydrophthalic anhydride, phthalic anhydride, maleic anhydride, methyl nadic anhydride and mixtures thereof. The curing agents are used in amounts of about 20 to about 100 parts by weight for each 100 parts by weight of epoxy resin.

In order that the glycidyl polyether may be effectively cured within reasonable periods of time at temperatures of about 130° C to 150° C, it is desirable to employ a small effective amount, within the range of about 0.05 to 2.0 parts by weight, of a curing accelerator for each 100 parts of the glycidyl polyether. The accelerators are selected from the group consisting of organic amines, metal amine chelates, amine borates, imidazoles, Lewis acids and Lewis bases, and polyborate esters. One or more of the accelerators may be employed simultaneously. Examples of suitable amines include monoethanolamine, piperidine, diethanolamine, triethanolamine, ethylenediamine, diethylene-triamine, dimethylaminopropylamine, pyrrolidine, and dimethylaminomethyl phenol. The metallic amine chelates which may form a portion of the curing catalyst of this invention may be prepared by initially reacting one mole of metal ester, having the general formula $M(OR)_4$, in which R is 1 to 4 carbon atoms, with two moles of triethanolamine and distilling off two moles of the resulting low boiling alcohol having the formula ROH where R represents the organic radical in the metal ester. Suitable metallic amine chelates which may be used in this invention include titanium amine chelate, aluminum amine chelate and silicon amine chelate.

All of the epoxy resins and their useful curing agents and curing accelerators are well known in the art. Reference may be made to *The Handbood Of Epoxy Resins,* (1967) by Lee and Neville, chapters 2 and 5, and U.S. Pat. No. 3,434,087, both herein incorporated by reference, for a detailed description of the synthesis and cure of epoxy resins.

The powdered glassy filler of this invention, which is useful to provide improved fluidity and loading characteristics for the filled resinous casting composition of this invention, comprises an admixture of about 250 to about 750 parts by weight per 100 parts by weight of epoxy resin of selected inorganic oxides comprising: about 50 to about 60 weight percent of $SiO_2$, about 12 to about 22 weight percent of $Al_2O_3$, about 5 to about 15 weight percent of $B_2O_3$, about 4 to about 14 weight percent of MgO, about 2.5 to about 12.5 weight percent of CaO, and preferably, for ease in melting to a glass, about 0.5 to about 2 weight percent of an alkali oxide selected from the group consisting of $Na_2O$, $K_2O$, $Li_2O$ and mixtures thereof.

The filler has a coefficient of linear thermal expansion of about $4.8 \times 10^{-6}$ in./in./° C between 100° C to 400° C, a density of about 2.5 grams/cubic centimeter and a pH of about 8.5 to 9.5. This provides a glassy oxide admixture easily wet by and having surface charge compatibility with epoxy resins. The surface charge compatibility is not completely understood at this time, but the particular selection of oxides is believed to play an important role in providing a surface charge to the filler admixture which allows fluidity with high loading, without contributing to premature resin polymerization.

The filler composition can be loaded up to about 85 weight percent of the filled resinous system and still provide a fluid, pourable and castable system. Generally, the filler composition will constitute from about 70 weight percent to about 85 weight percent of the filled resinous composition system, with a preferred range of about 75 to about 85 weight percent. This provides a casting composition having a viscosity of about 1,500 cp. to about 20,000 cp. at 100° C (Brookfield at 10 rpm) and when cured, a coefficient of linear thermal expansion (C.L.T.E.) of between about 15 in./in./° C to 25 in./in./° C between 25° C to 150° C.

Preferably, the filler will constitute particles having a particular cumulative particle size distribution as taught in U.S. Pat. No. 3,434,087: 18 wt. % greater than about 30 microns, 35 wt.% greater than about 20 microns, 20 wt.% to 60 wt.% greater than about 10 microns, 40 wt.% to 80 wt.% greater than about 4 microns, 60 wt.% to 90 wt. % greater than about 2 microns, 76 wt.% to 95 wt.% greater than about 1 micron, and 86 wt.% to 100 wt.% greater than about 0.4 micron; U.S. Pat. No. 3,547,871: 0.1 wt.% to 4 wt.% greater than about 210 microns, 9 wt.% to 34 wt.% greater than about 125 microns, 20 wt.% to 48 wt.% greater than about 88 microns, 35 wt.% to 62 wt.% greater than about 63 microns, 45 wt.% to 70 wt.% greater than about 44 microns, 56 wt.% to 79 wt.% greater than about 20 microns and 65 wt.% to 85 wt.% greater than about 10 microns; and U.S. Pat. No. 3,658,750, where the filler consists essentially of a coarse powder having a particle size range of from 150 microns to 500 microns and a fine powder having a particle size range smaller than 45 microns, where the filler comprises about 1 part by volume of coarse powder and not more than 1.5 parts by volume of fine powder; said patents being herein incorporated by reference.

The most preferred particle size distribution contains 0.1 wt.% to 15 wt.% greater than about 40 microns, 20 wt.% to 60 wt.% greater than about 10 microns, 40 wt.% to 80 wt.% greater than about 4 microns, 76 wt.% to 95 wt.% greater than about 1 micron, and 86 wt.% to 100 wt.% greater than about 0.4 micron. Of course, any other particle size distribution known to the art as providing high filler loadings for epoxy casting resin systems can be used in this invention.

Figure 2:
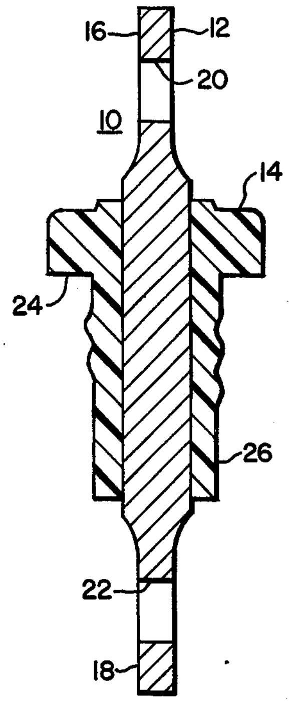
FIG. 2 is a side elevational view, in section, of the electrical bushing shown in FIG. 1, taken along the line II—II.

Referring now to the drawings, FIG. 1 and FIG. 2 show a front elevational and sectional view, respectively, of a mew and improved electrical bushing assembly 10. Bushing 10 includes a conductor stud 12 formed of a good electrical conductor, such as copper or aluminum, and a cast, encapsulating, solid insulator or body portion 14. The cast body portion 14 is cast directly onto stud 12, and it adheres tightly thereto even during thermal cycling. Therefore, it is unnecessary to provide a sealing gasket for the stud, which is required in prior art porcelain type bushings.

The stud 12 may be formed from a single piece or bar of aluminum, for example, which is cut to length, and its ends flattened and pierced, to form flattened ends 16 and 18, having openings 20 and 22 therein, respectively, for receiving bolts. The conductor stud may then be cleaned, such as by an acid etch, and then tin plated on at least its weather end 16, to prevent aluminum oxide from forming during the weathering of the bushing in service. The same acid etch may also be used to clean the stud to assure that the cast, covering, body portion 14 will adhere tightly thereto.

After the conductor stud 12 has been prepared, it may be inserted into a suitable mold. The mold is then generally placed in a heated vacuum chamber which is evacuated below about 5 millimeters of mercury. The resin system may then be poured into the evacuated mold. The vacuum pouring is preferred to prevent air inclusions from weakening the cast structure. After pouring the liquid casting resin system at approximately 100° C, the mold may be removed from the vacuum chamber and heated in an oven to a temperature of about 100° C to 120° C for 1 to 24 hours. After this heating operation, during which the cast resin system will gel, the mold may be removed and the bushing given a post cure at a temperature of about 150° C for 4 to 8 hours. The bushing is then completely finished and ready for installation in its associated apparatus.

The body portion 14 of the bushing assembly 10 may be of any suitable configuration. The bushing shown has a flanged portion 24, and a smaller diameter portion 26. Portion 26 extends into a suitably sized opening in the casing of electrical apparatus, such as a distribution transformer.

Electrical bushings as used in electrical transformers of the distribution type, have severe demands placed upon them in service. For example, the bushing assembly must pass severe thermal cycling tests, from −40° C to 135° C, without cracking. Since another requirement of the bushing is that the resin system adhere tightly to the conductor stud, in order to eliminate sealing gaskets, the thermal cycling test may only be passed by matching the coefficient of thermal expansion of the applied solid insulation system with that of the encapsulated conductor stud.

The insulation system, to be cast about the electrically conducting stud, must be freely pourable, in order to facilitate the manufacturing of the bushing assemblies, and also in order to remove the air from the bushing during vacuum pouring.

The electrical bushing assembly must also be weather resistant, crack resistant, high power arc and track resistant, it must withstand operation in hot transformer oil up to 100° C, and it must be rigid and retain its rigidity and strength up to 135° C.

EXAMPLE 1

A powdered, glassy, inorganic oxide filler, consisting essentially of 55 wt.% $SiO_2$, 17.4 wt.% $Al_2O_3$, 10.0 wt.% $B_2O_3$, 9.0 wt.% MgO, 7.6 wt.% CaO and 1.0 wt.% $Na_2O$, was made. The oxides were melted, fined to a clear homogeneous melt and then water-quenched to form a friable glass frit, using glass making techniques well known in the art. The glass was then ground up by dry milling for 60 hours in a U.S. Stoneware Burundum lined No. 4 mill, with 39 lbs. of Burundum cylindrical grinding media.

The filler had a coefficient of linear thermal expansion (C.L.T.E.) of $4.8 \times 10^{-6}$in./in./° C between 100° C and 400° C, a density of 2.5 gm./cc. and a pH of 9.1. The pH was determined by making a 30 vol.% filler suspension with distilled water in a Waring blender, boiling the suspension for 15 minutes, cooling to room temperature, removing the powder by filter pressing and measuring the pH of the water.

The filler had a cumulative particle size distribution, determined by the Whitby Method, as follows: about 1 wt.% greater than about 60 microns, about 5 wt.% greater than about 40 microns, about 42 wt.% greater than about 10 microns, about 65 wt.% greater than about 4 microns, about 85 wt.% greater than about 2 microns and about 99 wt.% greater than about 0.4 micron. The average particle size was 7.4 microns.

A filled resinous casting composition was prepared by mixing 200 grams of a liquid diglycidyl ether of bisphenol A epoxy resin, having an epoxy equivalent weight of 180 to 195 and a viscosity of 11,000 cp. to 13,500 cp. at 25° C (sold commerically by Union Carbide under the Tradename ERL 2774) and 160 grams of hexahydrophthalic anhydride (HHPA) epoxy resin curing agent at 100° C, and then slowly adding 1202.4 grams of the filler. Finally, 0.3 gram of 2-methyl imidazole (2-MI) accelerator was added.

This provided a filled resinous composition having 601.2 parts filler and 80 parts curing agent per 100 parts epoxy resin. The filler loading was 77 wt.% of the filled resinous composition. The filled resinous composition had a viscosity of about 3,500 cp. at 100° C (Brookfield Viscometer at 10 rpm) and was extremely fluid.

The filled resinous system had excellent pourability and was easily cast into test rod samples. The samples were heated for 16 hours at 100° C, followed by a 4 hour postcure at 150° C. The samples had a C.L.T.E. of $22.0 \times 10^{-6}$ in./in./° C between 25° C and 150° C and a flexural strength (modulus of rupture in 3-point loading) of 26,068 psi.

Ten pounds of the filled resinous system made as described above was cast without difficulty about bushing studs, and used to produce two 15 kV 200 ampere high voltage bushings. Procedures described hereinabove were used, with a heating cycle of about 16 hours at 100° C and about 4 hours at 150° C.

Corona tests were conducted on the bushings according to NEMA 107A standards, using a 500 picofarad coupling capacitor and a Stoddart NM25T instrument. The results of the tests are set out in TABLE 1 below:

TABLE 1

Electrical Properties of 15 kV 200 Ampere Bushings. Made From A $SiO_2$, $Al_2O_3$, $B_2O_3$, MgO, CaO, $Na_2O$ Filled Epoxy Resin System.

| Corona Tests Before Thermal Cycling | | | |
|---|---|---|---|
| Bushing 1 | | Bushing 2 | |
| kV | QP (micro v.) | kV | QP (micro v.) |
| 27 | Intermittent | 33 | Intermittent |
| 30 | 460 | 35 | 0 for 1 min. hold |
| 35 | 300 to 500 for 1 min hold | | |
| 25 | Stop | | |
| **Corona Tests After 10 Cycles From −40° C to +130° C** | | | |
| Bushing 1 | | Bushing 2 | |
| kV | QP (micro v.) | kV | QP (micro v.) |
| 33.5 | Start-Cleared | 34 | Start-Cleared |
| 35 | Intermittent-1 min. hold | 35 | 0 for 1 min. hold |
| 33 | Stop | | |

All of these tests indicate that this highly fluid and castable filled resinous composition has excellent electrical properties and is an excellent candidate as a low cost substitute for porcelain in transformer bushing applications. After the above thermal cycling between −40° C and +130° C, the applied composition adhered well to and did not break or separate from the metallic element of the electrical bushing assembly.

EXAMPLE 2

As a comparative example, four other filled resinous compositions were prepared. A quartz sample was prepared by slowly adding filler, consisting essentially of commercial crystalline $SiO_2$, to a mixture of 200 grams of ERL 2774 epoxy resin and 160 grams of HHPA curing agent heated to 100° C.

The filler had a C.L.T.E. of $8 \times 10^{-6}$ in./in./° C to $13.4 \times 10^{-6}$ in./in./° C between 0° C and 80° C, a density of 2.63 gm./cc. and a pH of 8.3. The filler was preground and had a cumulative particle size distribution as follows: about 1 wt.% greater than about 40 microns, about 3 wt.% greater than about 30 microns, about 30 wt.% greater than about 10 microns, about 60 wt.% greater than about 4 microns, about 80 wt.% greater than about 2 microns and 100 wt.% greater than about 0.4 micron. The average particle size was about 5.2 microns.

The filler could only be added to the hot epoxy-anhydride mixture to attain a 69.7 wt.% filler loading before the filled resinous composition lost all fluidity and formed a thick uncastable paste.

A bottle glass sample was prepared by slowly adding a commercial grade powdered glass filler consisting essentially of about 72 wt.% $SiO_2$, about 2.1 wt.% $Al_2O_3$, about 0.3 wt.% $B_2O_3$, about 10.2 wt.% CaO plus MgO, about 14.6 wt.% $Na_2O$ plus $K_2O$, about 0.4 wt.% BaO, about 0.2 wt.% $SO_3$ and about 0.2 wt.% F, to a mixture of 200 grams of ERL 2774 epoxy resin and 160 grams of HHPA curing agent heated to 100° C.

The filler had a C.L.T.E. of $9 \times 10^{-6}$ in./in./° C between 100° C and 400° C, a density of 2.51 gm./cc. and a pH of 11.9. The filler was dry milled for 96 hours and had a cumulative particle size distribution as follows: about 1 wt.% greater than about 55 microns, about 10 wt.% greater than about 30 microns, about 30 wt.% greater than about 10 microns, about 60 wt.% greater than about 4 microns, about 75 wt.% greater than about 2 microns and 100 wt.% greater than about 0.3 micron. The average particle size was about 5.3 microns.

The filler could only be added to the hot epoxy-anhydride mixture to attain a 63.7 wt.% filler loading before the filled resinous composition lost all fluidity and formed a thick uncastable paste.

A powdered Li-Al-Si oxide glassy filler, consisting essentially of about 73.8 wt.% $SiO_2$, about 10.3 wt.% $Al_2O_3$, about 12.8 wt.% $Li_2O$ and about 3.1 wt.% F was made. The oxides were melted, fined to a clear homogeneous melt and then water quenched to form a friable glass frit, using glass making techniques well known in the art. The glass was then ground up and slowly added to a mixture of 200 grams of ERL 2774 epoxy resin and 160 grams of HHPA curing agent heated to 100° C.

The filler had a C.L.T.E. of $8.8 \times 10^{-6}$ in./in./° C between 100° C and 400° C, a density of 2.42 gm./cc. and a pH of 12.1. The filler was dry milled for 114 hours and had a cumulative particle size distribution as follows: about 1 wt.% greater than about 50 microns, about 7 wt.% greater than about 30 microns, about 30 wt.% greater than about 10 microns, about 65 wt.% greater than about 4 microns, about 80 wt.% greater than about 2 microns and 100 wt.% greater than about 0.3 micron. The average particle size was about 5.6 microns.

The filler could only be added to the hot epoxy-anhydride mixture to attain a 71.2 wt.% filler loading before the filled resinous composition lost all fluidity and formed a thick uncastable paste.

Another sample of this same Li-Al-Si oxide glass was heat treated for 4 hours at 730° C to form a crystalline phase having glass ceramic properties, and then slowly added to a mixture of 200 grams of ERL 2774 epoxy resin and 160 grams of HHPA curing agent heated to 100° C.

This glass-ceramic Li-Al-Si filler had a very low C.L.T.E. of $2.6 \times 10^{-6}$ in./in./° C between 100° C and 400° C, a density of 2.42 gm./cc. and a pH of 12.3. The filler was dry milled for 126 hours and had a cumulative particle size distribution as follows: about 1 wt.% greater than about 55 microns, about 7 wt.% greater than about 30 microns, about 30 wt.% greater than about 10 microns, about 55 wt.% greater than about 4 microns, about 80 wt.% greater than about 2 microns and 100 wt.% greater than about 0.4 micron. The average particle size was about 4.8 microns.

The filler was added to the hot epoxy-anhydride mixture to attain a 75.2 wt.% filler loading. At that point, however, the fluidity was very poor, the viscosity was about 20,000 cp. to 25,000 cp., and the system was for all practical purposes uncastable.

All of these Example 1 and 2 samples used a filler composition having particle size distributions substantially within the teachings of U.S. Pat. No. 3,434,087 and they all had similar low densities. The Example 1 filler composition alone, having a medium pH and a particular combination of oxides, allowed loading substantially over 75 wt.% filler, and inclusion of imidazole accelerator without any appearance of loss of fluidity.

It is thought that the relatively low amounts of MgO and CaO, which are basic and relatively insoluble oxide compounds, contributes to a low surface energy and low heat of wetting phenomenon, which helps provide a relatively low interfacial energy between the filler and the epoxy resin, helping to prevent premature gellation and allowing fluidity with high filler loading.

We claim:

1. A fluid, filled, resinous casting composition, suitable for use with electrical assembly elements, comprising: (A) 100 parts by weight of a liquid resin, (B) about 250 parts by weight to about 750 parts by weight of a powdered glassy filler comprising: about 50 weight percent to about 60 weight percent of $SiO_2$, about 12 weight percent to about 22 weight percent of $Al_2O_3$, about 5 weight percent to about 15 weight percent of $B_2O_3$, about 4 weight percent to about 14 weight percent of MgO and about 2.5 weight percent to about 12.5 weight percent of CaO and (C) about 20 parts by weight to about 100 parts by weight of a resin curing agent, said fluid casting composition being characterized by a viscosity of between about 1,500 cp. and 20,000 cp. at 100° C.

2. The resinous casting composition of claim 1, wherein the liquid resin is an epoxy resin.

3. The resinous casting composition of claim 2, wherein the epoxy resin has an epoxy equivalent weight of between about 125 and about 450 and the filler also contains about 0.5 weight percent to about 2 weight percent of an alkali oxide selected from the group consisting of $Na_2O$, $K_2O$, $Li_2O$ and mixtures thereof.

4. The resinous casting composition of claim 2, having when cured, a coefficient of linear thermal expansion of between about 15 in./in./° C between 25° C to 150° C.

5. The resinous casting composition of claim 2, wherein the filler has a cumulative particle size distribution as follows: 0.1 weight percent to 15 weight percent greater than about 40 microns, 20 weight percent to 60 weight percent greater than about 10 microns, 40 weight percent to 80 weight percent greater than about 4 microns, 76 weight percent to 95 weight percent greater than about 1 micron and 86 weight percent to 100 weight percent greater than about 0.4 micron.

6. The resinous casting composition of claim 5, wherein the epoxy resin is a bisphenol A epoxy resin.

7. An electrical assembly comprising a metallic element and a cured, filled, resinous composition encapsulating at least a part of the metallic element, the cured resinous composition containing about 70 weight percent to about 85 weight percent glassy filler comprising: about 50 weight percent to about 60 weight percent of $SiO_2$, about 12 weight percent to about 22 weight percent of $Al_2O_3$, about 5 weight percent to about 15 weight percent of $B_2O_3$, about 4 weight percent to about 14 weight percent of MgO and about 2.5 weight percent to about 12.5 weight percent of CaO, said cured, filled, resinous composition characterized by a coefficient of linear thermal expansion between about 15 in./in./° C and 25 in./in./° C between 25° C to 150° C, whereby the composition adheres to the metallic element and does not separate under thermal cycling of the electrical assembly.

8. The assembly of claim 7, wherein the resinous composition contains epoxy resin.

9. The assembly of claim 8, wherein the epoxy resin has an epoxy equivalent weight of between about 125 and about 450 and the filler also contains about 0.5 weight percent to about 2 weight percent of an alkali oxide selected from the group consisting of $Na_2O$, $K_2O$, $Li_2O$ and mixtures thereof.

10. The assembly of claim 8, wherein the metallic element is the electrically conducting stud of a bushing.

* * * * *